United States Patent
Doebbeling et al.

(10) Patent No.: US 9,803,549 B2
(45) Date of Patent: Oct. 31, 2017

(54) USING RETURN WATER OF AN EVAPORATIVE INTAKE AIR COOLING SYSTEM FOR COOLING A COMPONENT OF A GAS TURBINE

(75) Inventors: Klaus Doebbeling, Windisch (CH); Andreas Rueter, Nussbaumen (CH); Christof Pfeiffer, Ennetbaden (CH)

(73) Assignee: ANSALDO ENERGIA IP UK LIMITED, London (GB)

(*) Notice: Subject to any disclaimer, the term of this patent is extended or adjusted under 35 U.S.C. 154(b) by 1274 days.

(21) Appl. No.: 13/407,168

(22) Filed: Feb. 28, 2012

(65) Prior Publication Data

US 2012/0216546 A1   Aug. 30, 2012

(30) Foreign Application Priority Data

Feb. 28, 2011 (CH) .................................... 0341/11

(51) Int. Cl.

| | |
|---|---|
| *F02C 3/30* | (2006.01) |
| *F01D 15/10* | (2006.01) |
| *F02C 7/143* | (2006.01) |
| *F01D 25/32* | (2006.01) |
| *F02C 7/057* | (2006.01) |

(52) U.S. Cl.
CPC ............ *F02C 7/1435* (2013.01); *F01D 15/10* (2013.01); *F01D 25/32* (2013.01); *F02C 3/305* (2013.01); *F02C 7/057* (2013.01); *F02C 3/30* (2013.01); *F05D 2220/32* (2013.01); *F05D 2220/76* (2013.01); *F05D 2270/053* (2013.01)

(58) Field of Classification Search
CPC .......... F02C 3/30; F02C 7/1435; F02C 3/305; F02C 7/057; F01D 15/10; F01D 25/32; F01C 7/057; F05D 2220/76; F05D 2220/32; F05D 2270/053
See application file for complete search history.

(56) References Cited

U.S. PATENT DOCUMENTS

| | | | | |
|---|---|---|---|---|
| 3,498,062 | A | * | 3/1970 | Daltry .............................. 60/688 |
| 4,418,527 | A | * | 12/1983 | Schlom et al. ................. 60/775 |
| 4,928,478 | A | * | 5/1990 | Maslak ................. F01K 21/047 |
| | | | | 60/39.3 |

(Continued)

FOREIGN PATENT DOCUMENTS

| | | | | |
|---|---|---|---|---|
| GB | WO 02/90721 | * | 5/2002 | ............. F01D 15/10 |
| JP | 55-142916 A | | 11/1980 | |

(Continued)

OTHER PUBLICATIONS

Swiss Search Report issued on Apr. 7, 2011, by European Patent Office as the International Searching Authority for Swiss Application No. 3410211.

*Primary Examiner* — Pascal M Bui Pho
*Assistant Examiner* — Eric Linderman
(74) *Attorney, Agent, or Firm* — Buchanan Ingersoll & Rooney PC

(57) ABSTRACT

A method and apparatus for the operation of a gas turbine unit with an evaporative intake air cooling system in the intake air pathway, wherein the return water flow of the evaporative intake air cooling system is used for the cooling of components of the gas turbine unit and/or of a generator coupled to the gas turbine unit and/or of another element coupled to the gas turbine unit, and a gas turbine unit adapted to be operated using this method.

21 Claims, 1 Drawing Sheet

(56) References Cited

U.S. PATENT DOCUMENTS

| | | | |
|---|---|---|---|
| 5,088,280 A * | 2/1992 | Scott-Scott et al. | 60/257 |
| 5,178,210 A * | 1/1993 | Guillet et al. | 165/111 |
| 5,353,585 A * | 10/1994 | Munk | F02B 47/02 60/39.53 |
| 6,073,637 A * | 6/2000 | Hayward | B08B 3/02 134/198 |
| 6,112,544 A * | 9/2000 | Blatter et al. | 62/434 |
| 6,240,730 B1 * | 6/2001 | Thiele | F01D 15/10 60/646 |
| 6,250,064 B1 | 6/2001 | Tomlinson et al. | |
| 6,478,289 B1 * | 11/2002 | Trewin | 261/27 |
| 6,817,185 B2 * | 11/2004 | Coney et al. | 60/772 |
| 7,065,953 B1 * | 6/2006 | Kopko | F02C 7/057 60/39.3 |
| 7,204,670 B1 * | 4/2007 | Meher-Homji | F02C 7/04 415/1 |
| 2004/0020206 A1 * | 2/2004 | Sullivan | F01C 1/0215 60/670 |
| 2004/0224210 A1 * | 11/2004 | Agnew | F02C 3/34 60/772 |
| 2005/0022536 A1 * | 2/2005 | Dovali-Solis | F02C 3/30 60/772 |
| 2005/0039433 A1 * | 2/2005 | Nakano et al. | 60/39.08 |
| 2005/0081529 A1 * | 4/2005 | Bolis et al. | 60/775 |
| 2006/0187593 A1 * | 8/2006 | Mahawili | B82Y 15/00 361/20 |
| 2007/0035137 A1 * | 2/2007 | Matsukuma | F01D 15/10 290/52 |
| 2007/0059159 A1 | 3/2007 | Hjerpe | |
| 2008/0216461 A1 * | 9/2008 | Nakano et al. | 60/39.53 |
| 2011/0239650 A1 * | 10/2011 | Amedick | F01D 15/10 60/670 |
| 2014/0225372 A1 * | 8/2014 | Scheu et al. | 290/54 |
| 2015/0315927 A1 * | 11/2015 | John | H02K 9/19 290/52 |
| 2015/0318763 A1 * | 11/2015 | Kubota | F01K 27/02 290/52 |
| 2017/0138259 A1 * | 5/2017 | Juretzek | F02C 6/08 |

FOREIGN PATENT DOCUMENTS

| | | |
|---|---|---|
| JP | 59-77010 A | 5/1984 |
| JP | 2000-104562 A | 4/2000 |
| WO | WO 03/089770 A1 | 10/2003 |

* cited by examiner

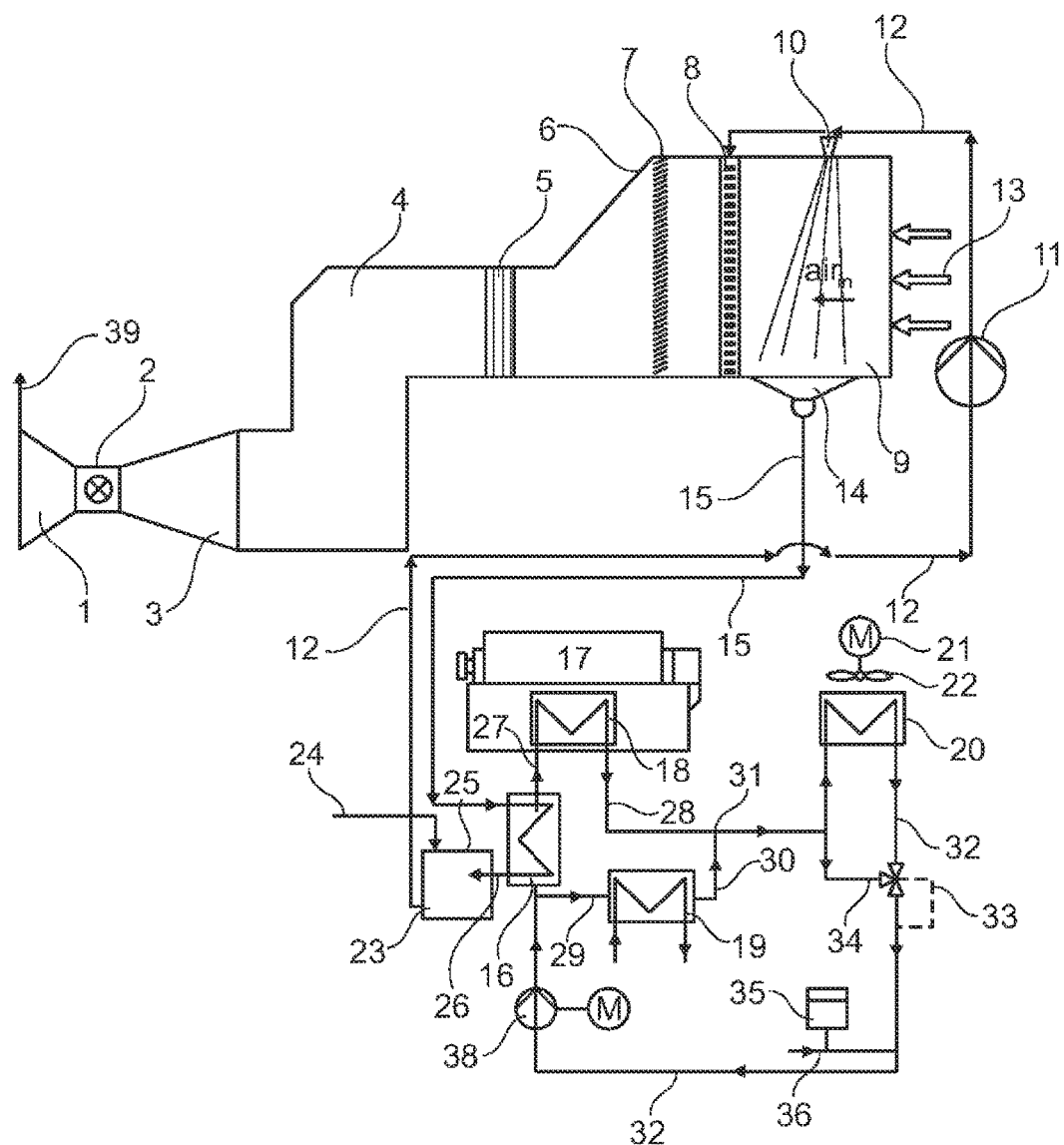

USING RETURN WATER OF AN EVAPORATIVE INTAKE AIR COOLING SYSTEM FOR COOLING A COMPONENT OF A GAS TURBINE

RELATED APPLICATION

This application claims priority under 35 U.S.C. §119 to Swiss Patent Application No. 00341/11 filed in Switzerland on Feb. 28, 2011, the entire content of which is hereby incorporated by reference in its entirety.

FIELD

The present disclosure relates to a method for the operation of a gas turbine unit, with respect to the use of heat within the system, as well as to a gas turbine unit for implementing this method.

BACKGROUND INFORMATION

The power output of a gas turbine unit can decrease with increasing ambient temperature. This decrease in power can be partially compensated by the use of an evaporative inlet cooling system.

Known totally enclosed water air cooled (TEWAC) turbo generators have a power capability that can decrease with increasing cooling water temperature. If a closed loop cooling water circuit with heat exchange to the ambient air is used, the cooling water temperatures available rise linearly with a rise in ambient temperature. As a consequence, a turbo generator that is correctly sized for gas turbines without evaporative inlet air cooling is often not capable of working with the additional power recovered by evaporative inlet air cooling.

To mitigate this issue one may use a turbo generator with larger size and capability, use pressurization of the turbo generator to increase its capability or add an evaporative spray system to the cooling water heat exchanger. The first is possible for newly built power plants and the second and third need additional equipment which creates additional costs and complexity.

SUMMARY

A method for the operation of a gas turbine unit having an evaporative intake air cooling system in an intake air pathway according to the disclosure, comprising: using a return water flow of the evaporative intake air cooling system for cooling of components of at least one of the gas turbine unit, a generator coupled to the gas turbine unit and another element coupled to the gas turbine unit.

A gas turbine unit according to the disclosure, comprising: an intake air manifold; at least one compressor located downstream of the intake air manifold; at least one combustor located downstream of the compressor; at least one turbine located downstream of the combustor; at least one evaporative gas turbine inlet cooling system located in or operatively attached to the intake air manifold; and at least one return water flow system for the evaporative gas turbine inlet cooling system water flow with at least one heat exchanger element for the exchange of heat with a secondary cooling medium flow operatively linked to at least one of components of the gas turbine unit, a generator coupled to the gas turbine unit, and of another element coupled to the gas turbine unit.

BRIEF DESCRIPTION OF THE DRAWINGS

Exemplary embodiments are described in the following with reference to the drawing, which is for the purpose of illustrating the embodiments and not for the purpose of limiting the same. In the drawing, FIG. 1 shows a schematic representation of a gas turbine unit with evaporative intake air cooling according to an exemplary embodiment of the disclosure.

DETAILED DESCRIPTION

The present disclosure pertains to a method for the operation of a gas turbine unit with an evaporative intake air cooling system in an intake air pathway. According to an exemplary embodiment of the disclosure, the return water flow of the evaporative intake air cooling system is recycled and reintroduced into the evaporative intake air cooling system and is used for the cooling of other parts of the system. These other parts can, for example, be components of the gas turbine unit and/or of a generator coupled to the gas turbine unit and/or of another element coupled to the gas turbine unit.

The return water of the evaporative intake air cooling system, due to the evaporation process, can have a temperature below ambient temperature, for example, close to the wet bulb temperature of the ambient air. According to an exemplary embodiment of the disclosure, and in order to reduce the cooling water temperature of the closed loop cooling water circuit while operating with evaporative cooling, the return water flow of the evaporative cooler is used to reduce the temperature in some other part of the unit, for example, to reduce the generator cold water temperature below the ambient temperature. The evaporative cooler return water flow temperature can be close to the wet bulb temperature of the ambient air, i.e., lower than ambient temperature. The evaporative cooler return water flow can be increased further by adding water spray nozzles upfront of the evaporative cooler packings and by collecting the cooled down water together with the evaporative cooler return flow.

According to an exemplary embodiment of the disclosure dual use is made of the evaporative cooling system in the inlet of a gas turbine. The first use is to cool down the gas turbine inflow below the ambient temperature (close to the wet bulb temperature), and the second use is to use the reduced temperature of the recirculating water of the evaporative cooler to reduce the temperature of the generator cold water supply.

According to an exemplary embodiment, the return water flow of the evaporative intake air cooling system can be used for the cooling of components of a generator coupled to the gas turbine unit, for example, by reducing the generator cold water temperature.

The return water flow can be cycled in a semi-closed cycle, for example, it is at least partly reintroduced into the evaporative intake air cooling system. The heat exchange, for the cooling of components of a gas turbine unit and/or of a generator coupled to the gas turbine unit and/or of another element coupled to the gas turbine unit, is effected in the return pathway to the evaporative intake air cooling system. Due to water impurities of the feed-water and intake air, which is captured by the water in the evaporative cooler, the concentration of contaminants in the return water and the evaporation water tank can increase over time. To keep the contamination level at an acceptable level part of the evaporative water or return water can periodically or continuously be replaced by fresh feed-water.

According to an exemplary embodiment according to the disclosure, the heat exchange between the return flow of the evaporative cooling water and a secondary cooling medium cycle takes place in a water heat exchanger in which, for example, under counterflow conditions, a liquid cooling medium of the secondary cooling cycle is cooled for the cooling of components of a gas turbine unit and/or of a generator coupled to the gas turbine unit and/or of another element coupled to the gas turbine unit.

The secondary cycle liquid cooling medium, which can be water optionally with additives, can be used in an essentially closed cycle, and which is cooled down with second heat exchange to the ambient air. The second heat exchange is located, in the flow path of the liquid cooling medium, downstream of the components of a gas turbine unit and/or of a generator coupled to the gas turbine unit and/or of another element coupled to the gas turbine unit to be cooled, and upstream of the water heat exchanger.

The second heat exchange to the ambient air can be carried out in a re-cooler flown through, for example, actively, by ambient air, for example, assisted by ventilation.

According to an exemplary embodiment according to the disclosure, water not evaporated and/or having too large a droplet size in the evaporative intake air cooling system is collected, for example, by gravity, in a cold water collector at the intake air manifold and is guided to a heat exchanger element, in which, for example, under counterflow conditions, cooling medium is cooled for the cooling of the components.

The evaporative intake air cooling system according to an exemplary embodiment of the disclosure can include an evaporative cooler, for example, arranged in the intake air manifold upstream of a droplet separator, and/or a droplet generation device for the spraying of water into the intake air flow. The droplet generation device can be an array and/or a grid of nozzles generating water droplets of a predetermined size distribution. In case of injection of water using spray nozzles, which can be used in accordance with an exemplary embodiment of the disclosure in combination with an evaporative cooling system or instead of such a cooling system, a particular size of droplets should be injected in order to avoid problems in the operation of the turbine unit. In particular too small droplets should be avoided because these could pass the droplet separator and lead to fogging effect, or to depositions in the flow path and large secondary droplets. On the other hand, too large droplets fall down too quickly due to gravity, leading to a low evaporative cooling effect. Large droplets spend too small a time in the intake air flow stream to reach the wet bulb temperature or at least approach the wet bulb temperature. Correspondingly therefore, the nozzles can generate water droplets with a Sauter mean diameter (D32) in the range of 40-200μ, for example, in the range of 16-120μ (micrometer). These size ranges can be realized by at least 90 mass-%, for example, by at least 95 mass-% of the total mass of the water injected into the intake air flow.

The water supplied to the evaporative intake air cooling system can be increased above the rated amount of the evaporative intake air cooling system for increasing the return water flow. The water supply to the total evaporative intake air cooling system can be adapted have a capacity in the range of 2-6 times the water mass flow evaporated in the cooling system.

Exemplary embodiments of the present disclosure also pertain to a gas turbine unit or an evaporative gas turbine inlet cooling system for carrying out the method outlined above. Such a gas turbine unit can include an intake air manifold or intake air duct, at least one compressor located downstream thereof, at least one combustor or combustion chamber located downstream thereof, and at least one turbine located downstream thereof. Downstream of the turbine there can be located a heat recovery steam generation system with associated steam turbines etc. An exemplary embodiment of the system according to the disclosure can include at least one evaporative gas turbine inlet cooling system located in or operatively attached to the intake air manifold, including at least one, return water flow system for the evaporative gas turbine inlet cooling system water flow with at least one heat exchanger element for the exchange of heat with a secondary cooling medium flow operatively linked to components of the gas turbine unit and/or of a generator coupled to the gas turbine unit and/or of another element coupled to the gas turbine unit.

An exemplary embodiment of the system according to the disclosure can include an ambient air cooling unit for cooling the secondary cooling medium flow located downstream, with respect to the secondary cooling medium flow, of the heatsink of the components of the gas turbine unit and/or of a generator coupled to the gas turbine unit and/or of another element coupled to the gas turbine unit. An exemplary embodiment of the system can include the heat exchanger element downstream, with respect to the secondary cooling medium flow, of the ambient air cooling unit and upstream of the heatsink.

The evaporative intake air cooling system according to an exemplary embodiment of the disclosure can include an evaporative cooler, for example, arranged in the intake air manifold upstream of a droplet separator, and/or a droplet generation device for the spraying of water into the intake air flow. The droplet generation device can be an array and/or grid of nozzles generating water droplets of a predetermined size distribution. The nozzles can be adapted for the generation of droplets with sizes and mass percent distributions as outlined above.

The secondary cooling medium flow can be linked with at least one further heat exchanger element, for example, a gas turbine lube oil cooler, which is included in the secondary cooling medium flow but bridging the heat exchanger element and the heatsink. These additional heat exchangers do not participate to the additional temperature reduction provided by the recycled evaporative cooling water but are nevertheless included in the ambient air secondary cooling cycle.

In such a system, the recirculating flow can be increased to allow cooling of the turbo generator cold water flow. The heat exchanger may have a fail safe bypass on one or both sides. The gas turbine maximum power setting can be calculated from the actual cold water temperature, the required apparent power (Cosphi) and the turbo generator capability curve. The gas turbine maximum power setting can also be calculated from the actual cold water temperature, the required apparent power (Cosphi) and the turbo generator capability curve and the plant can be run in closed loop control at maximum power.

According to an exemplary embodiment of the disclosure, a water to water heat exchanger with approximately 2K temperature difference can be implemented to exchange heat between the evaporative cooling recycling system and the generator cooling system. An additional pump can be included in the return flow of the evaporative cooling recycling system if the pressure drop of the heat exchanger does not allow sufficient through flow without a pump. Such a system may only be effective it the evaporative cooling system is active.

The system can be installed with a fail safe such that if the water to water heat exchanger has a too high pressure drop (fouling/blockage) a bypass is opened on the turbo generator cold water flow side and/or on the evaporative cooler return flow side.

In order not to exceed the turbo generator maximum cooling temperature, a closed loop control system to limit the maximum power of the gas turbine to the turbo generator capabilities can be implemented by measuring the cold water temperature at the turbo generator inlet and setting the max gas turbine shaft power using generator capability curves. For this option the operator could choose the required cosphi and subsequently can run the plant at maximized power.

FIG. 1 shows, schematically, a diagram of a gas turbine unit according to an exemplary embodiment of the disclosure for the implementation of the methods of the disclosure. The unit includes an intake air manifold 4 for the aspiration of intake air 13, for guiding it to the inlet of a compressor 3. The compressed air is used in a combustor 2 and downstream of the combustor the heated compressed air is expanded in a turbine 1. The outlet of such a turbine 1 can be connected with a heat recovery steam generator system for optimum use of the waist heat of the system.

In the intake air section 4 there is provided an evaporative cooler system 8. Downstream of this evaporative cooler system 8 there can be, for security reasons and to avoid too large droplets to enter the compression section, a droplet separator 7. Also there can be provided a silencer 5 between the droplet separator 7 and the actual intake of the compressor 3.

Upstream of the evaporative cooler 8 there can be a spray system, schematically indicated as one single spray nozzle 10. In practice however the spray system can be structured as a grid or array of spray nozzles, for the generation of small water droplets to be introduced into the intake air flow 13. The droplets can fall down by gravity and evaporate. However a certain fraction thereof will not completely evaporate but will be collected on the bottom of the intake section in a cold water collector 14.

Due to the passage through the intake air stream 13 and the concomitant evaporation on the surface of the droplets, the collected water has a temperature below the ambient air temperature, the so called wet bulb temperature. Therefore the water collected in the cold water collector 14 has a temperature which is below the temperature of the intake air 13 and is below the ambient air temperature. Upstream of the nozzle device 10 there can be provided an inlet air filter 9.

The water collected in the cold water collector 14 is guided, via collection water line 15, to a water heat exchanger 16, where it is used, in counter flow, to cool down a secondary cooling water cycle which will be described in more detail further below.

Downstream of water heat exchanger 16 it passes via line 26 to an evaporation water tank 23, the level of which is sensored via a level sensor 25, and the level of which can be changed by an additional feed water line 24. The supply to this feed water line 24 can be controlled by using sensor 25. Downstream of the evaporation water tank 23 the recycled water from the evaporative cooling system is transported via line 12, a recirculation line, back to the evaporative cooling system, i.e., to the units 8 and 10. This recirculation of the water, the temperature of which is now again above the wet bulb temperature due to the passage of unit 16, can be assisted by a pump 11. Part of the return water or water tank water can be dumped and replaced by fresh water from feed water line 24 to reduce the concentration of contaminations (not shown).

In the unit 16, heat is exchanged with a secondary cooling cycle. The cold water recycled from the evaporative cooling system can be used to cool down, for example, by small temperature differences, water in the secondary cooling cycle. This secondary cooling cycle can be used for the cooling of the generator 17 of the system. Downstream of the water heat exchanger 16 it passes, via line 27, to a generator air cooler 18. It will be heated within this heatsink and will then pass via line 28 to an ambient air cooling unit, for example, a cooling unit in which the secondary cycle cooling medium is cooled, for example, to just above ambient temperature. This cooling unit 20 can be driven by a ventilator 22 driven by a motor 21 forcing outside ambient air through the unit 20.

The cooling medium downstream of this re-cooler 20 in line 32, now having a temperature close to or just above ambient air temperature, passes a temperature control valve 33. The cooling unit 20 may also be by-passed via line 34. Downstream of the temperature control valve 33 there can be attached an expansion vessel 35, and a feed water line 36 can also be attached to this cycle. A pump 38 can drive the secondary cooling medium, which at this stage is just above ambient air temperature, to pass into water heat exchanger 16. There it is brought into thermal contact with the cooling water in the evaporative recycling water cycle which is at or just above the wet bulb temperature, so below ambient air temperature, such that the secondary cooling air water cycle in line 32 is at a higher temperature than downstream of water heat exchanger 16, in line 27.

As a first example, the following temperature values and flow rate values can apply in such a system.

A flow of intake air, for example, at an ambient temperature of 50° C. and 30% relative humidity can lead to the following conditions.

The wet bulb temperature, for example, the temperature of the water in line 15, can be in the range of 35° C. The flow rate in this line can be for example, about 12 l/s. water heat exchanger 16 and line 12 at around 53° C., can have the same flow rate of 12 l/s. Assuming a supply of feed water via line 24 which can be at a temperature of about 38° C. and can have a flow rate of about 3 l/s, this can lead to a temperature in line 12 of around ambient temperature, for example, around 50° C. under the above assumptions, at a flow rate of about 15 l/s. In other words, in unit 16 the recycled water of the evaporative cooling system can be heated by approximately 20° C.

The larger mass flow in the secondary cooling cycle, for example, can lead to conditions where in line 32, downstream of the ambient air cooling unit 20, the cooling water has a temperature of about 55° C. and a flow rate of about 36 l/s. After having passed water heat exchanger 16, so in line 27 upstream of unit 18, it can then have a temperature of about 49° C. at a flow rate of about 36 l/s.

It should be noted that for practical reasons it can be beneficial to have a branch-off line 29 from line 32 to incorporate additional heat exchange units 19, downstream of which via line 30 and junction 31 the cooling medium is reintroduced into line 28. However this by-passing cycle does not benefit from the additional cooling in water heat exchanger 16. Such a heat exchanger unit 19 can, for example, be a gas turbine loop oil cooler.

In an exemplary embodiment, an evaporative cooling system can have a inflow of about 7 l/sec of which about 3 l/sec are evaporated and the remaining 4 l/sec return at close to wet bulb temperature. At an assumed 50° C. ambient temperature and 30% relative humidity the wet bulb temperature can be approximately 33° C. (17K below ambient)

With an active generator cooling the cooling water, flow to the generator 17 is at approximately 55° C. with a flow of about 34 l/sec. In a counter flow heat exchanger the "geno-cold" cooling water can be cooled down by about 2.3 K to 53.7° C. and the evaporative cooler return flow can be heated up from about 33° C. to about 53° C. With this arrangement, for example, a 2 to 4% higher turbo generator capability can be achieved.

By increasing the water flow into the evaporative cooler or adding water spray nozzles upfront of the evaporative coolers from about 7 l/sec to about 15 l/sec, the return flow can increase to about 12 l/sec and the additional cooling capability can be increased 3 fold to about 7 K, i.e., generator cold cooling water can then be supplied at about 48° C. instead of 55° C. which can increase turbo generator capability by approximately 7 to 10%.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

| List of Reference Signs | |
|---|---|
| 1 | turbine |
| 2 | combustor |
| 3 | compressor |
| 4 | intake air manifold |
| 5 | silencer |
| 6 | converging portion of 4 |
| 7 | droplet separator |
| 8 | evaporative cooler |
| 9 | inlet air filter |
| 10 | spray nozzle |
| 11 | pump for recirculated cooling water |
| 12 | recirculation line |
| 13 | intake air |
| 14 | cold water collector |
| 15 | collection water line |
| 16 | water heat exchanger |
| 17 | generator |
| 18 | generator air cooler |
| 19 | gas turbine lube oil cooler |
| 20 | re-cooler |
| 21 | motor |
| 22 | ventilator |
| 23 | evaporation water tank |
| 24 | feed water |
| 25 | level sensor |
| 26 | line to 23 |
| 27 | line to 18 |
| 28 | line to 20 |
| 29 | branch-off line from 32 to 19 |
| 30 | line from 19 |
| 31 | junction |
| 32 | recirculation line from 20 to 16 |
| 33 | temperature control valve |
| 34 | short cut line to 33 |
| 35 | expansion vessel |
| 36 | feed water |
| 37 | motor |
| 38 | circulation pump |
| 39 | exhaust of turbine, to heat recovery steam generator |

What is claimed is:

1. A method for the operation of a gas turbine unit, the method comprising:
   cooling a gas turbine inflow below ambient temperature with a return water flow at an evaporative cooler of an evaporative intake air cooling system;
   collecting the return water from the evaporative cooler that is not evaporated in the evaporative intake air cooling system, in a cold water collector at the evaporative cooler;
   guiding the return water from the cold water collector via a collection water line to a water heat exchanger;
   exchanging heat from the water heater exchanger to a cooling cycle with a liquid cooling medium, wherein the liquid cooling medium flows to at least a generator air cooler, the cooling cycle including a generator coupled to the gas turbine unit and the generator air cooler; and
   recirculating at least a portion of the return water from the heater exchanger via a recirculation line to the evaporative intake air cooling system.

2. The method according to claim 1, further comprising:
   using the return water flow of the evaporative intake air cooling system for the cooling of components of the generator coupled to the gas turbine unit, by reducing a generator cold water temperature.

3. The method according to claim 1, comprising:
   cooling the liquid cooling medium, under counter-flow conditions, for the cooling of components of the gas turbine unit, and the at least one of the generator coupled to the gas turbine unit and another element coupled to the gas turbine unit.

4. The method according to claim 3, comprising:
   using the liquid cooling medium, in an essentially closed cycle; and
   cooling down the liquid cooling medium with a second heat exchange to ambient air, wherein the second heat exchange is located, in a flow path of the liquid cooling medium, downstream of the components of the gas turbine unit, and the at least one of the generator coupled to the gas turbine unit and of another element coupled to the gas turbine unit to be cooled, and upstream of the water heat exchanger.

5. The method according to claim 4, comprising:
   carrying out the second heat exchange to the ambient air in a re-cooler flown through, by ambient air.

6. The method according to claim 4, wherein the liquid cooling medium is water optionally with additives.

7. The method according to claim 5, wherein the second heat exchanger to the ambient air through the re-cooler is carried out actively with mechanical ventilation.

8. The method according to claim 1, comprising:
   cooling the intake air in an evaporative cooler, arranged in the evaporative air cooler upstream of a droplet separator, by a droplet generation device for spraying of the return water into the intake air flow.

9. The method according to claim 8, comprising:
   generating water droplets with a Sauter mean diameter in a range of 40-200μ.

10. The method according to claim 8, comprising:
    generating water droplets with a Sauter mean diameter in a range of 16-120μ.

11. The method according to claim 8, comprising:
    wherein the droplet generation device comprises at least one nozzle configured to generate water droplets of a predetermined size distribution.

12. The method according to claim 11, comprising:
    arranging an air inlet air filter upstream of the at least one nozzle, the air inlet air filter configured to generate water droplets of the predetermined size distribution.

13. The method according to claim 8, comprising:
    arranging a silencer between the droplet separator and an intake of a compressor.

14. The method according to claim 9, wherein the droplets fall down by gravity and evaporate.

15. The method according to claim 1, comprising:
increasing the water supplied to the evaporative intake air cooling system above a rated amount of the evaporative intake air cooling system for increasing the return water flow.

16. The method according to claim 1, comprising:
passing the return water flow from the water heat exchanger to an evaporative water tank;
sensing a level of the return water flow in the evaporative water tank; and
changing the level of the return water flow in the evaporative water tank via an additional feed water line.

17. The method according to claim 16, comprising:
replacing a portion of the return water flow with fresh water via the additional feed water line in the evaporative water tank.

18. A gas turbine unit comprising:
an evaporative cooler;
an evaporative intake air cooling system located in or operatively attached to the evaporative cooler, wherein a gas turbine inflow is cooled below ambient temperature with a return water flow at the evaporation cooler by collecting the return water from the evaporative cooler that is not evaporated in the evaporative intake air cooling system, in a cold water collector at the evaporative cooler, and guiding the return water from the cold water collector via a collection water line to a water heat exchanger; and
a cooling cycle for the evaporative intake air cooling system with the water heat exchanger for an exchange of heat with a liquid cooling medium, wherein the liquid cooling medium flows to at least a generator air cooler, the cooling cycle including a generator coupled to the gas turbine unit and the generator air cooler, and wherein at least a portion of the return water from the water heater exchanger is recirculated via a recirculation line to the evaporative intake air cooling system.

19. The gas turbine unit according to claim 18, comprising:
an ambient air cooling unit for cooling the liquid cooling medium flow located downstream, with respect to the liquid cooling medium flow, of a heatsink of the at least one of the components of the gas turbine unit, the generator coupled to the gas turbine unit and another element coupled to the gas turbine unit, the water heat exchanger downstream, with respect to the liquid cooling medium flow, of the ambient air cooling unit and upstream of the heatsink.

20. The gas turbine unit according to claim 18, comprising:
a droplet generation device for spraying of water into the gas turbine inflow, wherein the droplet generation device is at least one nozzle generating water droplets of a predetermined size distribution.

21. The gas turbine unit according to claim 19, comprising:
a link of the liquid cooling medium flow with at least one further heat exchanger element, included in the liquid cooling medium flow and bridging the heat exchanger element and the heatsink.

* * * * *